United States Patent
Ko et al.

(10) Patent No.: US 10,132,936 B2
(45) Date of Patent: Nov. 20, 2018

(54) ALPHA PARTICLE DETECTION APPARATUS USING DUAL PROBE STRUCTURED IONIZATION CHAMBER AND DIFFERENTIAL AMPLIFIER

(71) Applicant: FTLAB CO., LTD., Ansan-si, Gyeonggi-do (KR)

(72) Inventors: Jae Jun Ko, Seoul (KR); Young Gweon Kim, Anyang-si (KR)

(73) Assignee: FTLAB CO., LTD., Ansan-si, Gyeonggi-Do (KR)

( * ) Notice: Subject to any disclaimer, the term of this patent is extended or adjusted under 35 U.S.C. 154(b) by 0 days.

(21) Appl. No.: 15/547,331

(22) PCT Filed: Jul. 21, 2016

(86) PCT No.: PCT/KR2016/007941
§ 371 (c)(1),
(2) Date: Jul. 28, 2017

(87) PCT Pub. No.: WO2017/034158
PCT Pub. Date: Mar. 2, 2017

(65) Prior Publication Data
US 2018/0031712 A1 Feb. 1, 2018

(30) Foreign Application Priority Data
Aug. 24, 2015 (KR) .................. 10-2015-0118972

(51) Int. Cl.
*G01T 1/178* (2006.01)
*G01T 1/185* (2006.01)
(Continued)

(52) U.S. Cl.
CPC .............. *G01T 1/178* (2013.01); *G01T 1/185* (2013.01); *G01T 7/00* (2013.01); *H01J 47/02* (2013.01)

(58) Field of Classification Search
CPC ............ G01T 1/178; G01T 1/185; G01T 7/00
See application file for complete search history.

(56) References Cited

U.S. PATENT DOCUMENTS 3,873,840 A * 3/1975 Ellis .................. G01T 1/185
250/374
4,262,203 A 4/1981 Overhoff
(Continued)

FOREIGN PATENT DOCUMENTS

| JP | 2006046972 A | 2/2006 |
| KR | 1020150093987 A | 8/2015 |
| WO | 2015026619 A1 | 2/2015 |

OTHER PUBLICATIONS

International Search Report dated Nov. 3, 2016 for PCT/KR2016/007941 and English translation.

*Primary Examiner* — Hugh H Maupin
(74) *Attorney, Agent, or Firm* — Lucas & Mercanti, LLP

(57) ABSTRACT

Disclosed in an alpha particle detection apparatus using a dual probe structured ionization chamber and a differential amplifier, the apparatus including: an ionization chamber forming electric field thereinside by bias power applied to a surface thereof; a main probe unit absorbing ionic charges generated in an occurrence of alpha ($\alpha$) decay in the ionization chamber; a guard ring unit absorbing leakage current generated between the ionization chamber and the main probe unit and flowing the leakage current to a ground; an auxiliary probe allowing surrounding noise to be introduced therein; first and second preamplifiers amplifying fine electrical signals to a predetermined magnitude; and a differential canceling a noise signal and outputting an alpha particle detection signal by amplifying a voltage difference between the preamplified electrical signals. As such, it is possible to effectively detect alpha ($\alpha$) particles which are a type of radiation.

9 Claims, 5 Drawing Sheets

(51) Int. Cl.
 *G01T 7/00* (2006.01)
 *H01J 47/02* (2006.01)

(56) References Cited

U.S. PATENT DOCUMENTS

| | | | | |
|---|---|---|---|---|
| 6,331,707 | B1 * | 12/2001 | Orr | G01T 1/178 |
| | | | | 250/376 |
| 7,105,831 | B1 * | 9/2006 | Kronenberg | H01J 47/02 |
| | | | | 250/382 |
| 2002/0008206 | A1 | 1/2002 | Orr et al. | |
| 2005/0122118 | A1 * | 6/2005 | Zank | G01D 9/005 |
| | | | | 324/457 |
| 2015/0279642 | A1 * | 10/2015 | Prance | G01T 1/185 |
| | | | | 250/282 |

* cited by examiner

ALPHA PARTICLE DETECTION APPARATUS USING DUAL PROBE STRUCTURED IONIZATION CHAMBER AND DIFFERENTIAL AMPLIFIER

CROSS-REFERENCE TO RELATED APPLICATIONS

This application is a U.S. national stage of PCT/KR2016/007941, filed Jul. 21, 2016, which claims the priority from Korean Patent Application No. 10-2015-0118972, filed Aug. 24, 2015, the contents of each of which are incorporated herein by reference.

TECHNICAL FIELD

The present invention relates to an alpha particle detection apparatus using a dual probe structured ionization chamber and a differential amplifier, the apparatus being capable of effectively detecting alpha a particles, which is a type of radiation.

BACKGROUND ART

Generally, the human body is exposed to natural radiation existing in nature. As the natural radiation existing in nature, there are: alpha rays, beta rays, and gamma rays which are radiated from radioactive isotopes present in the atmosphere, earth and rock; and cosmic rays that are radiated from space to the human body by sunlight.

In addition to natural radiation, the human body is also radiated by artificial radiation generated by humans, for example, radiation generated by products such as medical devices, TVs, fluorescent lamps, computers, electronic products, machinery, etc.

Since the radiation that is radiated to the human body has various effects thereon, the International Atomic Energy Agency has set a recommended value of 3 mSv (radiation irradiation unit) per year. Accordingly, in Korea, the radiation safety guide tolerance is set to less than 1 mSv per year.

Particularly, naturally occurring alpha radiation by radon (Rn) gas contained in the air that constitutes about 50% or more of the radiation dose to which a person is exposed. Usually, controlled radon concentration in the atmosphere varies from country to country, but it is recommended at 60 to 200 Bq/m3 or less. The Republic of Korea currently specifies radon (Rn) concentration as 4 pCi/l (148 Bq/m$^3$) as a recommendation standard for indoor air quality.

As described above, radon (Rn) gas, which is the main cause of radiation exposure in general, continues to move to the ground via soil and gravel surrounding the building, whereafter it moves to room to room through the space of the building and through the pores of the concrete. It is known that radon (Rn) permeating from the surrounding soil is the main cause of indoor radon (Rn). In addition, building materials such as concrete, gypsum board, gravel, and brick also become sources of indoor radon Rn pollution.

In addition, since radon Rn is easily dissolved in water, it may flow indoor through movement of groundwater. Indoor movement through water occurs due to a capillary phenomena and water pressure whereby water passes through the pores of concrete. The higher the indoor temperature, the lower the pressure, and thus the more radon Rn gas flows into the indoor.

When radon Rn gas present in the atmosphere as described above is inhaled, alpha particles emitted from radon Rn are directly radiated to the lung cells, thereby destroying the cells. Thus, radon Rn is a primary carcinogen that has a very strong biological effect, such as lung cancer, on humans.

In order to accurately evaluate the indoor concentration of radon Rn, which greatly affects human health as described above, various types of measuring instruments, and various measuring methods and devices have been widely used and developed. Since radon Rn is a colorless, odorless inert gas, there is no reactivity and direct measurement is difficult. Since the frequency of alpha particles generated in an occurrence of alpha ($\alpha$) decay is proportional to the radon concentration, indoor radon concentration is measured by detecting alpha particles present in the atmosphere. In other words, an accurate detection of alpha particles is a method of accurately measuring the indoor radon concentrations.

Generally, as apparatuses for detecting alpha particles, surface barrier type detectors, high purity semiconductor (pure Ge) detectors, scintillation detectors, solid state junction counters, pulsed ionization chambers, etc. are used.

Describing surface barrier type detectors, a depletion layer such as p-n junction is formed on a surface of a semiconductor due to a surface level or an oxide film, thus the vicinity of the surface becomes an obstacle of charge movements. For practical use, about 100 m/cd of gold is deposited on the surface of n-type Si, and the deposited surface is used as one electrode, and radiation is radiated to another side. Herein, there are various depletion layers having a thickness of about 50~500 m. The depletion layer is used for detecting charged alpha particles generated due to alpha radiation since energy loss on the surface of the depletion layer is low. In addition, the depletion layer has good energy resolution. However, since it is necessary to block external light, the surface barrier type detector becomes close to a sealed type and air circulation therein is not smooth, so a forced circulation pump is mainly used. In addition, bias power having relatively high voltage must be applied since the charged particles have to collide with the surface of the semiconductor, thus the price is high and detection efficiency is low as a limitation of 2D measurement since a semiconductor detection element having a large surface area is required.

High-purity semiconductor detectors are generally as pure Ge detectors. High purity semiconductors are high-purity Ge crystals with very small impurity concentrations and defects, has a very high electrical resistance at low temperature, and are this capable a high bias voltage applied thereto. Pure Ge is different from as Ge(Li) in that the pure Ge may be stored at room temperature and is only cooled by liquid nitrogen whenever the measurement is performed. Thus, it is easy to maintain, energy resolution may be in comparison with that of Ge(Li). Accordingly, pure Ge has been put to practical use. However, the price is very expensive, and the volume is very large since liquid nitrogen cooling is essential.

Describing scintillation detectors, a phenomenon in which light is emitted by charged particles colliding with various materials has been known for a long time. However, emissions due to alpha radiation of zinc sulfide (ZnS) or a NaI coating film are particularly strong, and may be detected and counted by a magnifying glass in a dark room.

The above emission refers to a scintillation, and a substance that exhibits the above phenomenon is called a scintillator. In addition, the scintillator with a photo-multiplier is called a scintillation detector. Particularly, a method of using a coefficient as a pulse output is called a scintillation counter.

Meanwhile, a method of reading an output as a DC type is mainly used for measuring doses, and the method is called a scintillation dosimeter since the method uses a scintillator. Any one of solid, liquid, and gas may be used as a scintillator. When liquid is used, it may be called as a liquid scintillation counting device. The advantage of the scintillation detector is that the sensitivity is very high, but the disadvantage thereof is that the durability is poor since the zinc sulfide (ZnS) or the NaI coating film is weak against moisture. In addition, the price of the detector becomes expensive since an expensive photo-multiplier is essentially required.

Solid state junction counters use solid inverse-bias p-n junction semiconductors, and are counters that are configured to collect ionic charges from alpha particles passing through a depletion layer. The counters may be manufactured in a small size that is portable. However, a surface of the metal electrode of a detector thereof should not be scratched or peeled off, and no external light should be introduced. In addition, recently, such counters are mainly used to slowly measure indoor radon concentration with a low price and a simple structure by protecting a measuring sensor from light and dust by an ionization chamber (24 hours to 48 hours required only for the first data display). Solid state junction counters are not used as real-time alpha particle detection devices since the sensitivity thereof is very low as 0.02 to 0.03 CPM/pCi/l.

Pulsed ionization chambers are configured with a metal cylinder in which a probe is installed as an electrode in the center of a metal cylinder and electric field is formed thereinside by applying a bias voltage between the metal cylinder and the electrode. When alpha particles are emitted due to an occurrence of alpha decay within an ionization chamber, the alpha particles dissipate due to collision with air, but ionic charges are generated. Alpha particles may be detected by absorbing the generated ionic charges by using the probe electrode, and amplifying the absorbed charge signal. Prices of chambers are very cheap since the sensor itself is configured with a metal cylinder and a probe, and the chambers have good durability and are light-free, so ventilation may be improved. However, input impedance of the sensor is close to infinity and is sensitive to electrical noises, so it is very difficult to design a measuring circuit with a high signal-to-noise ratio. Thus, the integral type ionization chamber is widely used rather than a pulsed type due to the easy removal of noises. However, since electrical pulses have to be counted to detect alpha particles generated in the occurrence of alpha decay, a detecting circuit has to be designed in a pulsed type. Therefore, it is essential to solve the noise which is the fundamental problem of the ionization chamber.

DISCLOSURE

Technical Problem

Accordingly, the present invention has been made keeping in mind the above problems occurring in the prior art, and an object of the present invention is to provide an alpha particle detection apparatus using a dual probe structured ionization chamber and a differential amplifier, the apparatus being capable of effectively canceling electrical noises which are externally introduced and general problems of an ionization chamber by using a dual probe structured ionization chamber and a differential amplifier, and detecting alpha particles with high sensitivity and low noise, whereby the apparatus can be inexpensively manufactured in a small size that is easy to transfer.

Technical Solution

In order to accomplish the above object, according to one aspect of the present invention, there is provided an alpha particle detection apparatus using a dual probe structured ionization chamber and a differential amplifier, the apparatus including: an ionization chamber being open or covered with a wire mesh on a first side thereof, and formed with a plurality of holes on an outer circumferential surface thereof to smoothly circulate air, and forming electric field thereinside by bias power applied to a surface thereof; a main probe unit disposed within the ionization chamber at a first end thereof, and absorbing ionic charges generated in an occurrence of alpha ($\alpha$) decay in the ionization chamber; a guard ring unit coupled to a second side of the ionization chamber so that the main probe unit passes through the ionization chamber, and absorbing leakage current generated between the ionization chamber and the main probe unit and flowing the leakage current to a ground; an auxiliary probe unit, disposed within the ionization chamber by passing through the guard ring unit at a first end thereof, spaced apart from the main probe unit by a predetermined distance, and allowing surrounding noise to be introduced therein; first and second preamplifiers connected to second ends of the main probe unit and the auxiliary probe unit, respectively, and amplifying fine electrical signals respectively input from the main probe unit and the auxiliary probe unit to a predetermined magnitude; and a differential amplifier connected to output terminals of the first and second preamplifiers at a non-inverting terminal (+) and an inverting terminal (−) thereof, and canceling a noise signal and outputting an alpha particle detection signal by amplifying a voltage difference between the electrical signals preamplified by the first and second preamplifiers.

Herein, preferably, the bias power applied to the surface of the ionization chamber may be a DC voltage of a range of 50V and 200V.

Preferably, the main probe unit may be configured to detect the ionic charges, the ionic charges being generated by collisions between alpha particles generated in the occurrence of alpha ($\alpha$) decay in the ionization chamber, and air.

Preferably, the auxiliary probe unit may have a length that is shorter than a length of the main probe unit.

Preferably, the auxiliary probe unit may be arranged within the ionization chamber with an exposure area that is smaller than an exposure area of the main probe unit within the ionization chamber.

According to another aspect of the present invention, there is provided an alpha particle detection apparatus using a dual probe structured ionization chamber and a differential amplifier, the apparatus including: an ionization chamber being open or covered with a wire mesh on a first side thereof, formed with a plurality of holes on an outer circumferential surface thereof to smoothly circulate air, and forming electric field thereinside by bias power applied to a surface thereof; a probe unit disposed within the ionization chamber at a first end thereof, and absorbing ionic charges generated in an occurrence of alpha ($\alpha$) decay in the ionization chamber; a guard ring unit coupled to a second side of the ionization chamber so that the probe unit passes through the ionization chamber, and absorbing leakage current generated between the ionization chamber and the probe unit and flowing the leakage current to a ground; a noise detection unit disposed between the guard ring unit and the ground and flowing DC type leakage current generated between the ionization chamber and the probe unit to the ground side, and detecting and outputting an AC type noise; first and second preamplifiers connected to a second end of the probe unit and to an output terminal of the noise detection unit, respectively, and amplifying fine electrical signals respectively input from the probe unit and the noise detection unit to a predetermined magnitude; and a differential amplifier connected to output terminals of the first and second preamplifiers at a non-inverting terminal (+) and an inverting terminal (−) thereof, and canceling a noise signal and outputting an alpha particle detection signal by amplifying a voltage difference between the electrical signals preamplified by the first and second preamplifiers.

Herein, preferably, the bias power applied to the surface of the ionization chamber may be a DC voltage of a range of 50V and 200V.

Preferably, the probe unit may be configured to detect the ionic charge, the ionic charges being generated by collisions between alpha particles generated in the occurrence of alpha (α) decay in the ionization chamber, and air.

Preferably, the noise detection unit may be configured by electrically connecting active elements of at least any one of a resistor, a condenser, and a diode, in a serial, parallel, or serial and parallel combination.

Advantageous Effects

As described above, according to an alpha particle detection apparatus using a dual probe structured ionization chamber and a differential amplifier of the present invention, alpha decay frequencies within an ionization chamber may be accurately measured since a signal-to-noise ratio becomes high by effectively canceling electrical noises which are externally introduced and by amplifying only an ionic signal according to alpha decay by using a dual probe structured ionization chamber and a differential amplifier. In addition, the apparatus is inexpensive and has a small size that is easy to transfer. Thereby, the apparatus may be used as a low cost and real time core measurement module for continuous radon detection.

BEST MODE

The objects, features and advantages of the invention will appear more fully upon consideration of the illustrative embodiments now to be described in detail with the accompanying drawings. Accordingly, the technological concepts of the present invention can be easily understood by one skilled in the art. In addition, the detailed description of known techniques relating to the present invention will be omitted so as not to obscure the gist of the invention.

While terms including ordinal numbers, such as "first", "second", etc., may be used to describe various components, such components are not limited by the above terms. The above terms are used only to distinguish one component from another. For example, a first component may be referred to as a second component without departing from the scope of the present invention, and likewise a second component may be referred to as a first component. The terms used in this application are used to merely describe the particular embodiments and are not intended to limit the present invention. Expressions of the singular numbers include the expressions of the plural numbers unless they are obviously differently expressed in the context.

All terms including descriptive or technical terms which are used herein should be construed as having meanings that are obvious to one of ordinary skill in the art. However, the terms may have different meanings according to an intention of one of ordinary skill art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

The terms "include (or including)" or "comprise (or comprising)" are inclusive or open-ended and does not exclude additional, un-recited elements or method steps. "Unit", "module", "block", etc. used herein each represent a unit for handling at least one function or operation, and may be implemented in hardware, software, or a combination thereof.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. The embodiments of the present invention are provided to describe the present invention more clearly to those skilled in the art.

Figure 1:
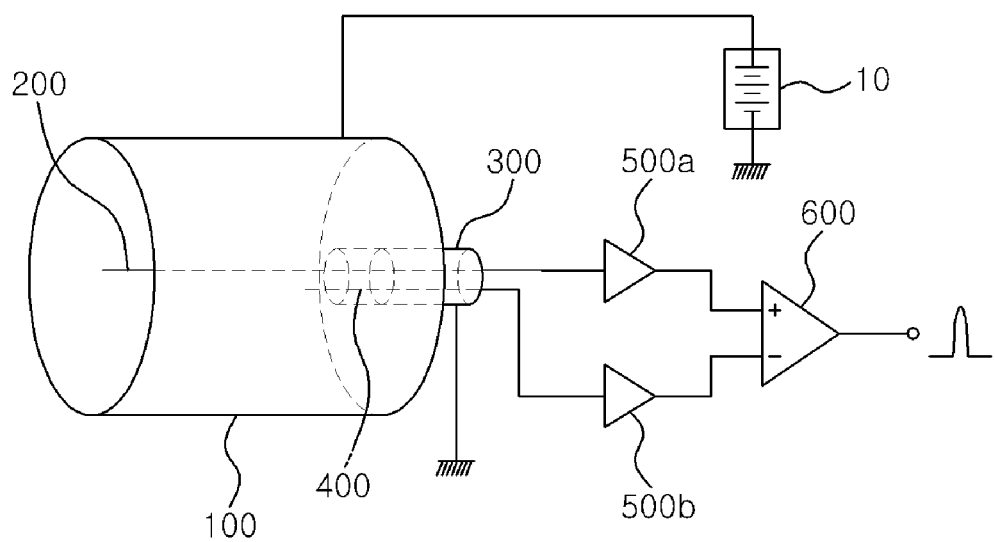
FIG. 1 is a view showing the entire configuration of an alpha particle detection apparatus using a dual probe structured ionization chamber and a differential amplifier according to a first embodiment of the present invention.
Figure 2:
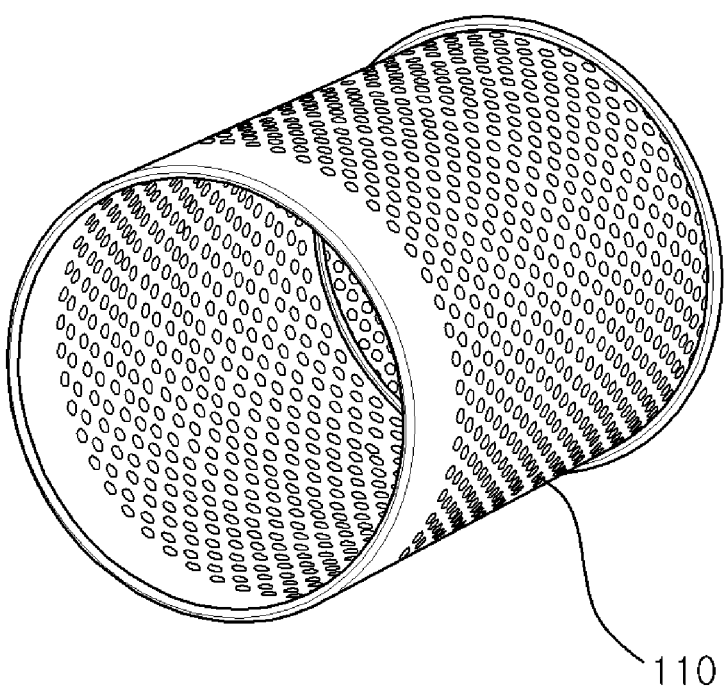
FIG. 2 is a perspective view in which an ionization chamber is used in embodiments of the present invention.
Figure 3:
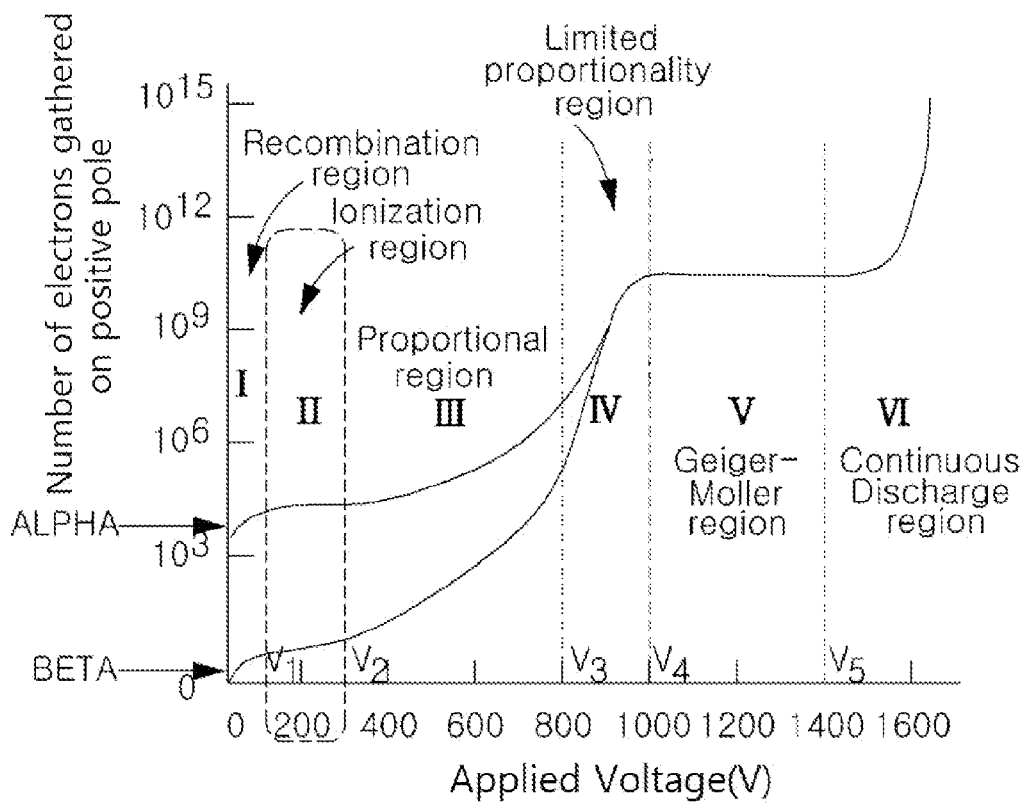
FIG. 3 is a graph showing a number of electrons gathered in a positive pole according to bias power applied to the ionization chamber that is used in embodiments of the present invention.

FIG. 1 is a view showing the entire configuration of an alpha particle detection apparatus using a dual probe structured ionization chamber and a differential amplifier according to a first embodiment of the present invention, FIG. 2 is a perspective view in which an ionization chamber is used in embodiments of the present invention, and FIG. 3 is a graph showing a number of electrons gathered in a positive pole according to bias power applied to the ionization chamber that is used in embodiments of the present invention.

Referring to FIGS. 1 and 2, the alpha particle detection apparatus using the dual probe structured ionization chamber and the differential amplifier according to the first embodiment of the present invention includes: an ionization chamber 100, a main probe unit 200, a guard ring unit 300, an auxiliary probe unit 400, first and second preamplifiers 500a and 500b, and a differential amplifier 600.

Herein, the ionization chamber 100 is open or covered with a wire mesh on a first side thereof, and configured with a cylindrical form of conductive materials. The ionization chamber 100 is formed with a plurality of holes 110 on an outer circumferential surface thereof or on a bottom surface thereof or both. Since the ionization chamber 100 has an air-permeable structure in which air flows freely by using the plurality of holes 110, concentration balance with the outside is fast, so a high-speed measurement is possible.

In addition, electric field is formed between inner surfaces of the main probe unit 200 and the ionization chamber 100 by applying bias power 10 with a high voltage to a surface of the ionization chamber 100. Thus, ionic charges generated in an occurrence of alpha a decay in the ionization chamber may be absorbed by the main probe unit 200. The ionization chamber 100 has a simple and inexpensive structure to implement, and is capable of performing a three-dimensional measurement.

In addition, as the bias power 10 of the high voltage applied to the surface of the ionization chamber 100, a stable DC voltage having a range of about 50 V to 300 V (preferably, about 50 V to 150 V) is used, and additional ionic charges may be effectively generated when alpha decay occurs in the ionization chamber 100 (Refer to FIG. 3). Meanwhile, power supplied from the bias power 10 with the high voltage (for example, voltage or current) may be variously changed according to a measurement range and sensitivity.

The main probe unit 200 is configured with a long-bar shape of conductive materials so that the main probe unit 200 may absorb the generated ionic charges in the occurrence of alpha a decay due to radon Rb nuclides. The main probe unit 200 is disposed within the ionization chamber 100 at a first end thereof, and absorbs ionic charges generated in the occurrence of alpha a decay of introduced air within the ionization chamber 100.

It is preferable to configure the main probe unit 200 to detect alpha particles that are generated in the occurrence alpha decay by radon Rn gas in the introduced air within the ionization chamber 100, but it is not limited thereto. It may be configured to detect all radioactive gases emitted as alpha a particles.

The guard ring unit 300 is configured with a cylindrical form of conductive materials, is coupled to a second side of the ionization chamber 100 so that the main probe unit 200 passes through the guard ring unit 300, and absorbs leakage current generated between the ionization chamber 100 and the main probe unit 200 and flows the leakage current to a ground.

There arises a problem that a signal-to-noise ratio (SNR) becomes poor since a current signal obtained from the main probe unit 200 and a leakage current signal are added to each other when the guard ring unit 300 is not provided.

The auxiliary probe unit 400 is configured with a rod-shape of conductive materials and having a predetermined length so that background noises are introduced thereinto. The auxiliary probe unit 400 is disposed within the ionization chamber 100 by passing through the guard ring unit 300 at a first end thereof, and is spaced apart from the main probe unit 200 by a predetermined distance.

Meanwhile, it is preferable for the auxiliary probe unit 400 to have a length that is shorter than a length of the main probe unit 200. In addition, it is preferable for the auxiliary probe unit 400 to have an exposure area within the ionization chamber 100 which is smaller than an exposure area of the main probe unit 200 within the ionization chamber 100.

The first and second preamplifiers 500a and 500b are electrically connected to the main probe unit 200 and the auxiliary probe unit 400 with input terminal thereof, respectively, and amplify fine electrical signals respectively input from the main probe unit 200 and the auxiliary probe unit 400 to a predetermined magnitude.

In addition, the differential amplifier 600 may be electrically connected to respective output terminals of the first and second preamplifiers 500a and 500b at a non-inverting terminal (+) and an inverting terminal (−) thereof, and effectively cancel a noise signal and output an alpha particle detection signal by proportionally amplifying a voltage difference between electrical signals that are signals respectively preamplified by the first and second preamplifiers 500a and 500b.

In other words, when the voltage difference is amplified by using the differential amplifier 600, noises having the same phases and which are introduced through the main probe unit 200 and the auxiliary probe unit 400 may be effectively canceled, thus a high-sensitivity and low-noise alpha particle detection signal may be accurately and rapidly obtained.

Meanwhile, although it is not shown in the figure, a control means (for example, an MCU) that calculates a concentration value of the alpha particles (for example, a radon concentration value) by counting the alpha particle detection signal (for example, a pulse signal) output from the differential amplifier 600 for a predetermined measurement time (e.g., 10 minutes, 30 minutes, 1 hour, etc.) may be provided.

Figure 4:
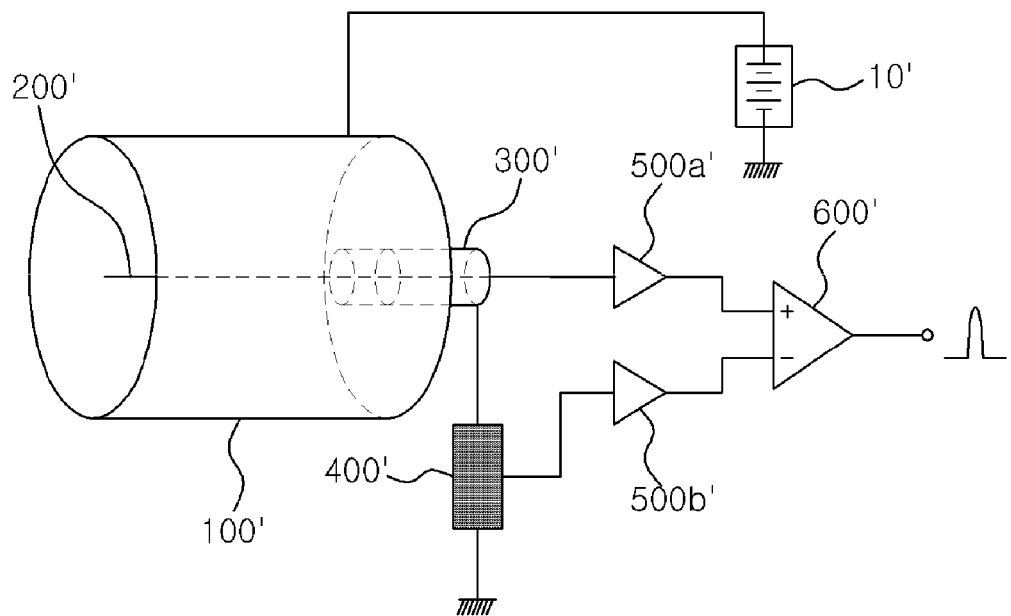
FIG. 4 is a view showing the entire configuration of an alpha particle detection apparatus using a dual probe structured ionization chamber and a differential amplifier according to a second embodiment of the present invention.

FIG. 4 is a view showing the entire configuration of an alpha particle detection apparatus using a dual probe structured ionization chamber and a differential amplifier according to a second embodiment of the present invention.

Referring to FIG. 4, the alpha particle detection apparatus using the dual probe structured ionization chamber and the differential amplifier according to the second embodiment of the present invention includes: an ionization chamber 100'; a probe unit 200'; a guard ring unit 300'; a noise detection unit 400', first and second preamplifiers 500a' and 500b', and a differential amplifier 600'.

Herein, the ionization chamber 100' is open or covered with a wire mesh on a first side thereof, and configured with a cylindrical form of conductive materials.

The ionization chamber 100' is formed with a plurality of holes 110 (Refer to FIG. 2) on an outer circumferential surface thereof or on a bottom surface thereof or. Since the ionization chamber 100' has an air-permeable structure in which air flows freely by using the plurality of holes 110, concentration balance with the outside is fast, so a high-speed measurement is possible.

In addition, electric field is formed between inner surfaces of the probe unit 200' and the ionization chamber 100' by applying bias power 10' with a high voltage to a surface of the ionization chamber 100'. Thus, ionic charges generated in the occurrence of alpha a decay in the ionization chamber 100' may be absorbed by the probe unit 200'. The ionization chamber 100' has a simple and inexpensive structure to implement, and is capable of performing a three-dimensional measurement.

In addition, as the bias power 10' of the high voltage applied to the surface of the ionization chamber 100', a stable DC voltage having a range of about 50 V to 300 V (preferably, about 50 V to 150 V) is used, and additional ionic charges may be effectively generated when alpha decay occurs in the ionization chamber 100' (Refer to FIG. 3). Meanwhile, power supplied from the bias power 10' with the high voltage (for example, voltage or current) may be variously changed according to a measurement range and sensitivity.

The probe unit 200' is configured with a long-bar shape of conductive materials so that the probe unit 200' may absorb the generated ionic charges in the occurrence of alpha a decay due to radon Rb nuclides. The probe unit 200' is disposed within the ionization chamber 100' at a first end thereof, and absorbs ionic charges generated in the occurrence of alpha a decay of introduced air within the ionization chamber 100'.

It is preferable to configure the probe unit 200' to detect alpha particles that are generated in the occurrence of alpha decay by radon Rn gas in the introduced air within the ionization chamber 100', but it is not limited thereto. It may be configured to detect all radioactive gases emitted as alpha particles.

The guard ring unit 300' is configured with a cylindrical form of conductive materials, is coupled to a second side of the ionization chamber 100' so that the probe unit 200' passes through the guard ring unit 300', and absorbs leakage current generated between the ionization chamber 100' and the probe unit 200' and flows the leakage current to the ground.

The noise detection unit 400' is electrically connected between the guard ring unit 300' and the ground, maintains potential of the guard ring unit 300' to be slightly higher than the ground, and flows DC type leakage current generated between the ionization chamber 100' and the probe unit 200' to the ground. In addition, the noise detection unit 400' detects and outputs an AC type noise to the second preamplifier 500b' that will be described later.

Accordingly, in the second embodiment of the present invention, unlikely the above-described first embodiment, the auxiliary probe unit 400 is removed, and the noise detection unit 400' is provided to perform functions of the auxiliary probe unit 400 by using the guard ring unit 300'. It is structurally simpler than the first embodiment.

It is preferable for the noise detection unit 400' to be configured by electrically connecting active elements of at least any one of, for example, a resistor, a condenser, and a diode, in a serial, parallel, or serial and parallel combination.

The first and second preamplifiers 500a' and 500b' are electrically connected to output terminals of the probe unit 200' and the noise detection unit 400' at respective input terminals thereof, and amplify fine electrical signals respectively input from the probe unit 200' and the noise detection unit 400' to a predetermined magnitude.

In addition, the differential amplifier 600' is electrically connected to respective output terminals of the first and second preamplifiers 500a' and 500b' at a non-inverting terminal (+) and an inverting terminal (−) thereof, and cancels a noise signal and outputs an alpha particle detection signal by proportionally amplifying a voltage difference between electrical signals that are signals respectively preamplified by the first and second preamplifiers 500a' and 500b'.

In other words, when the voltage difference is amplified by using the differential amplifier 600', noises having the same phases and which are introduced through the probe unit 200' and the noise detection unit 400' may be effectively canceled, thus a high-sensitivity and low-noise alpha particle detection signal may be accurately and rapidly obtained.

Figure 5:
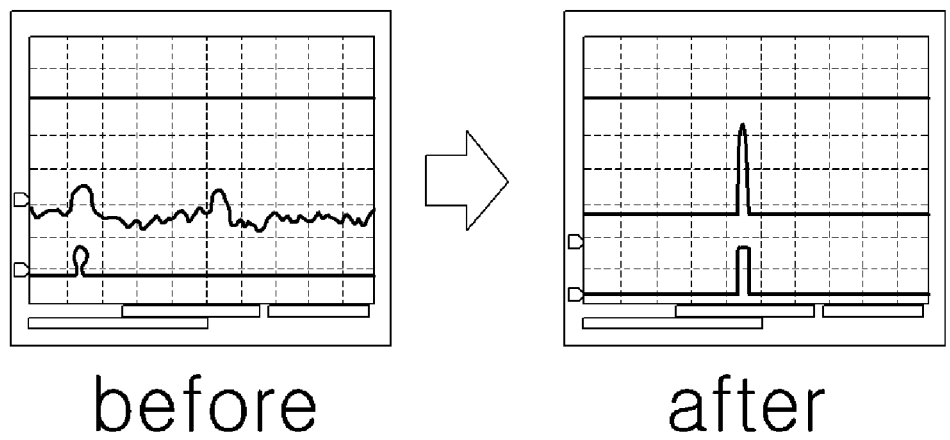
FIG. 5 is a view showing noise reduction results according to the embodiments of the present invention in result waves measured by an oscilloscope.

FIG. 5 is a view showing noise reduction results according to the embodiments of the present invention which are shown in result waves measured by an oscilloscope. The FIG. 5 shows a result of an output wave of a detection circuit (right side figure) when alpha particles are detected by using the alpha particle detection apparatus using the dual probe structured ionization chamber and the differential amplifier according to the embodiments of the present invention, and an output wave of a detection circuit (left side figure) when alpha particles are detected by using a general ionization chamber and circuit. The output waves are compared by using the oscilloscope.

Referring to FIG. 5, when the configuration units of the present invention are used, a difference between the alpha particle detection signal and the background noise signal, in other words, the signal-to-noise ratio (SNR) is greatly increased.

While the alpha particle detection apparatus using the dual probe structured ionization chamber and the differential amplifier according to the preferred embodiment of the present disclosure have been described hereinabove, the present disclosure is not limited thereto, and it should be understood that the present disclosure may be modified and embodied in various forms within the scope of the appended claims, the detailed description of the invention, and the accompanying drawings, and such modifications fall within the scope of the present disclosure.

INDUSTRIAL APPLICABILITY

The present invention may be widely used in an alpha particle detecting apparatus.

The invention claimed is:

1. An alpha particle detection apparatus using a dual probe structured ionization chamber and a differential amplifier, the apparatus comprising:
    an ionization chamber being open or covered with a wire mesh on a first side thereof, formed with a plurality of holes on an outer circumferential surface thereof to smoothly circulate air, and forming electric field thereinside by bias power applied to a surface thereof;
    a main probe unit disposed within the ionization chamber at a first end thereof, and absorbing ionic charges generated in an occurrence of alpha ($\alpha$) decay in the ionization chamber;
    a guard ring unit coupled to a second side of the ionization chamber so that the main probe unit passes through the ionization chamber, and absorbing leakage current generated between the ionization chamber and the main probe unit and flowing the leakage current to a ground;
    an auxiliary probe unit disposed within the ionization chamber by passing through the guard ring unit at a first end thereof, spaced apart from the main probe unit by a predetermined distance, and allowing surrounding noise to be introduced therein;
    first and second preamplifiers connected to second ends of the main probe unit and the auxiliary probe unit, respectively, and amplifying fine electrical signals respectively input from the main probe unit and the auxiliary probe unit to a predetermined magnitude; and
    a differential amplifier connected to output terminals of the first and second preamplifiers at a non-inverting terminal (+) and an inverting terminal (−) thereof, respectively, and canceling a noise signal and outputting an alpha particle detection signal by amplifying a voltage difference between the electrical signals preamplified by the first and second preamplifiers.

2. The apparatus of claim 1, wherein the bias power applied to the surface of the ionization chamber is a DC voltage having a range of 50V and 200V.

3. The apparatus of claim 1, wherein the main probe unit is configured to detect the ionic charges, the ionic charges being generated by collisions between alpha particles generated in the occurrence of alpha ($\alpha$) decay in the ionization chamber, and air.

4. The apparatus of claim 1, wherein the auxiliary probe unit has a length that is shorter than a length of the main probe unit.

5. The apparatus of claim 1, wherein the auxiliary probe unit is arranged within the ionization chamber with an exposure area that is smaller than an exposure area of the main probe unit within the ionization chamber.

6. An alpha particle detection apparatus using a dual probe structured ionization chamber and a differential amplifier, the apparatus comprising:
- an ionization chamber being open or covered with a wire mesh on a first side thereof, formed with a plurality of holes on an outer circumferential surface thereof to smoothly circulate air, and forming electric field thereinside by bias power applied to a surface thereof;
- a probe unit disposed within the ionization chamber at a first end thereof, and absorbing ionic charges generated in an occurrence of alpha (α) decay in the ionization chamber;
- a guard ring unit coupled to a second side of the ionization chamber so that the probe unit passes through the ionization chamber, and absorbing leakage current generated between the ionization chamber and the main probe unit and flowing the leakage current to a ground;
- a noise detection unit disposed between the guard ring unit and the ground and flowing DC type leakage current generated between the ionization chamber and the probe unit to the ground, and detecting and outputting an AC type noise;
- first and second preamplifiers connected to a second end of the probe unit and to an output terminal of the noise detection unit, respectively, and amplifying fine electrical signals respectively input from the probe unit and the noise detection unit to a predetermined magnitude; and
- a differential amplifier connected to output terminals of the first and second preamplifiers at a non-inverting terminal (+) and an inverting terminal (−) thereof, respectively, and canceling a noise signal and outputting an alpha particle detection signal by amplifying a voltage difference between the electrical signals preamplified by the first and second preamplifiers.

7. The apparatus of claim 6, wherein the bias power applied to the surface of the ionization chamber is a DC voltage having a range of 50V and 200V.

8. The apparatus of claim 6, wherein the main probe unit is configured to detect the ionic charge, the ionic charges being generated by collisions between alpha particles generated in the occurrence of alpha (α) decay in the ionization chamber, and air.

9. The apparatus of claim 6, wherein the noise detection unit is configured by electrically connecting active elements of at least any one of a resistor, a condenser, and a diode, in a serial, parallel, or serial and parallel combination.

* * * * *